United States Patent Office 3,740,207
Patented June 19, 1973

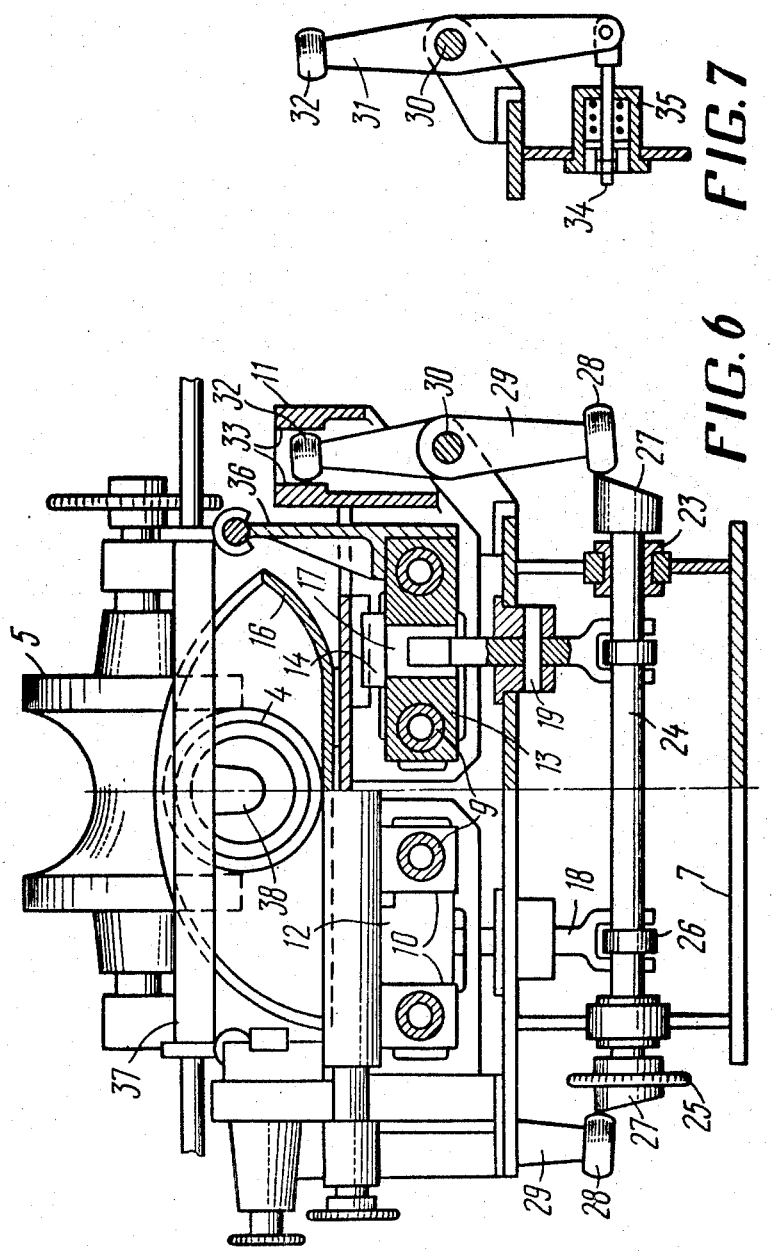

3,740,207
SHAPED PRODUCTS FROM THERMOPLASTIC MATERIAL
German Nikolaevich Bogrets, Oktyabrskaya ploschad 5, kv. 18; Nikolai Pavlovich Bondar, ploschad Leninskogo komsomola 1, kv. 43; and Grigory Alexandrovich Sizonenko, ulitsa Sim feropolskaya 19, kv. 29, all of Dnepropetrovsk, U.S.S.R.; Anatoly Gavrilovich Minakov, ulitsa Levanevskogo 18, kv. 6, Konstantinovka Donetskoi Oblasti, U.S.S.R.; Mikhail Ivanovich Barsukov, ulitsa Entuziastov 91, kv. 36, Kiev, U.S.S.R.; Grigory Iosifovich Mitkevich, ulitsa Ukrainskaya 204, Konstantinovka Donetskoi Oblasti, U.S.S.R.; Vyacheslav Fedorovich Dudkin, ulitsa Lenina 1, kv. 57; and Andrei Mikhailovich Teslya, ulitsa Dzerzhinskogo 24, kv. 55, both of Dnepropetrovsk, U.S.S.R.; and Nikolai Emelyanovich Kolomiets, ulitsa Shmidta 33, kv. 23, Konstantinovka Donetskoi Oblasti, U.S.S.R.
Filed July 22, 1970, Ser. No. 57,134
Int. Cl. C03b 9/10
U.S. Cl. 65—67
6 Claims

ABSTRACT OF THE DISCLOSURE

A method of forming shaped products from thermoplastic materials, by bending a plastic strip with the use of shaper members which reciprocate both lengthwise and crosswise relative to a continuously moving strip. A device for carrying said method into effect is characterized by the fact that said shaper members are fixed to structural components which are imparted reciprocating motion from a drive both lengthwise and crosswise relative to the strip under treatment.

---

This invention relates to methods of and devices for forming shaped products from thermoplastic materials, i.e., materials that are liable to soften or plasticize when exposed to heat such as glass, metals and plastics (synthetic materials of organic origin).

Known in the present state of the art are a method of and a device for forming shaped products from a glass strip found in plasticized state.

The forming process occurs while pulling a glass strip through fixed forming members which impart a trough-like shape to the strip.

When resorting to the above-said forming technique, the glass strip is liable to break at high travelling speeds, therefore the strip pulling speed and, consequently, the efficiency of the device are fairly restricted.

A relatively low rate of the glass strip travel prevents the prior-art technique from being practicable in forming shaped products from types of glass featuring a short solidification period. Among such glasses are mostly those capable of crystallizing into a glass-crystalline material.

An additional disadvantage has been that a continuous rubbing of the strip while being pulled, against the working surfaces of the shaper members causes a premature wear thereon which fact adversely affects the size of the product being formed and materially impairs its quality.

It is an object of the present invention to provide a method of forming shaped products from thermoplastic materials, and a device for effecting said method in which both said method and said device enable a continuous forming process of quality products without applying any traction efforts to the thermoplastic-material strip and at a high rate of travel of the strip which, in turn, would make it possible to form shaped products from materials possessing a short solidification period.

The above and other objects are accomplished by the provision of a method of forming shaped products from thermoplastic materials, said method residing in that a continuously travelling strip which is in plasticized state, is subject to bending by shaper members which are concurrently traversed first towards each other and in the longitudinal direction of the strip travel for the length of feed and then are brought apart to return into the initial position for the next length of feed and formation of a next section of the product involved.

When forming closed-contour shaped products, use is made of a mandrel reciprocatingly traversable lengthwise relative to the strip simultaneously with the shaper members.

The herein-disclosed device for forming shaped products from the aforesaid materials comprises at least one bar fixed in position on the bed; slide blocks fitted onto said bar so as to be capable of traversing therealong; parts carrying shaper members and adapted to cooperate with said slide blocks; a structural component fitted onto said bar; a drive to impart to said parts carrying shaper members, motion both crosswise and lengthwise relative to the strip under treatment, said drive being drivingly connected with said parts carrying shaper members through said structural component.

It is a general object of the present invention to eliminate the afore-mentioned disadvantages of the prior known methods and devices.

It is a specific object of the present invention to provide a method of forming shaped products from thermoplastic materials, mostly from glass, wherein shaper members are instrumental in moving the strip during the process of forming the product, and to provide a device for carrying said method into effect featuring such an arrangement of the shaper members that ensures a continuous forming process of quality products without applying any traction efforts to the strip, such strip travelling at high speeds, which, in turn, makes it possible to form shaped products from types of glass possessing a short solidification period.

Said object is accomplished due to the fact that the process of forming shaped products from thermoplastic materials, by bending a continuously travelling strip found in plasticized state, according to the invention is effected by way of concurrently traversing the shaper members towards each other and in the direction of the strip travel for the length of feed, whereupon the shaper members are brought apart to return into the initial position for the next length of feed and forming a next section of the product involved.

When forming closed-contour shaped products, use is made of a mandrel reciprocatingly traversable lengthwise relative to the strip together with the shaper members.

In a device for carrying said method into effect, having shaper members, according to the invention each of the shaper members is fixed in place on a component adapted to interact with slide blocks fitted onto at least one bar rigidly linked to the bed so that the slide blocks can travel along said bar, and wherein fitted over the bar is a structural component drivingly connecting the part carrying the shaper member with the drive to impart to said member motion both lengthwise and crosswise motion relative to the strip axis.

In the case of forming closed-contour products, the device is provided with a mandrel rigidly coupled to the component kinematically associating the shaper members with the drive.

The part which is to interact with the slide blocks can be a platform made as a channel iron in the flanges of which are made holes to accommodate the slide blocks therein, and the web of which is provided with slots to interact with the projections of the components drivingly connecting the platforms carrying the shaper members with the drive.

Each of the components drivingly connecting the platform carrying the shaper member with the drive, may be provided with a socket or nest for the arm end to fit thereinto, while the other arm end carries a roller and is linked to the rod of a spring actuator, the roller being adapted to interact with a cam set on a shaft interconnected to the drive.

It is expedient that each of the platforms carrying the shaper member have guideways in the top portion thereof for being linked to the upper end of the arms fitted over the shaft to which is fixed also the arm whose end interacts with the cam set at the shaft end.

The essence of the invention resides in the following:

The process of forming shaped products occurs in alternating steps so that the shaper members perform continuous reciprocating motion lengthwise and crosswise relative to a plasticized strip travelling at a constant speed. Due to the above fact the shaper members are instrumental in advancing the strip in the forming process, whereby any traction efforts applied to the strip when it passes through the shaper members may be eliminated and the traveling speed of the strip is increased, i.e., the possibility arises of forming products from materials possessing a short solidification period.

An unobstructed strip feed through the shaper members practically rules out any rubbing therebetween, whereby high-quality products can be readily obtained.

In what follows the nature of the present invention is explained by the accompanying drawings illustrating the method disclosed herein and by the drawings of a specific device embodying the invention, wherein:

FIG. 6 is a section taken on the line VI—VI in FIG. 4; and

FIG. 7 is a section taken on the line VII—VII in FIG. 4.

The herein-proposed method of forming shaped products is considered below in an exemplary forming of a tubular product from a glass strip.

Figure 1:
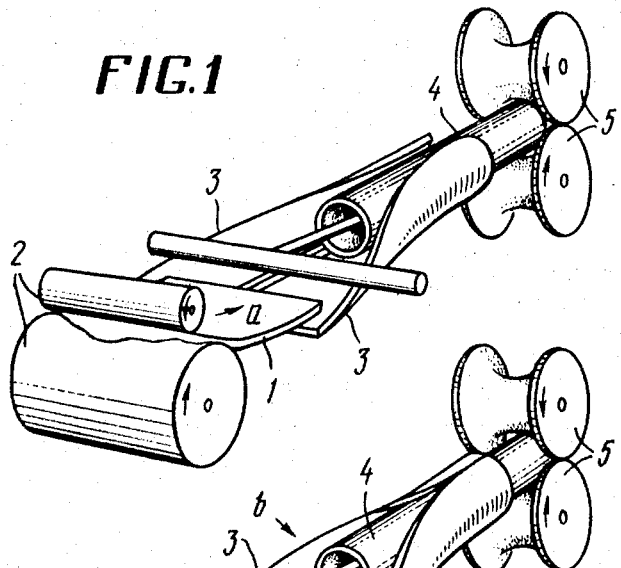
FIG. 1 is a schematic representation of the first stage of a forming process of a tubular product.

Now referring to FIG. 1, a glass strip 1 upon being rolled by rolls 2, is fed to shaper members 3 which, when in the initial position, are spaced apart from each other and adjacent to the rolls 2. A mandrel 4 when in the initial position is so positioned that one of its ends is found within the zone of size rolls 5.

Figure 2:
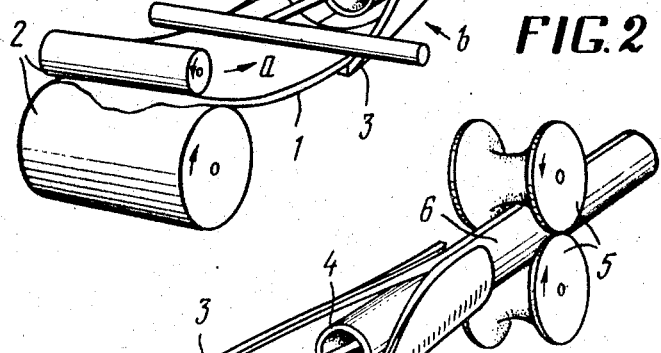
FIG. 2 illustrates the same process at the beginning of the strip bending.

As the strip 1, continuously fed from the rolls, advances for a length of feed (as indicated by the arrow $a$) the shaper members start approaching each other (as shown by the arrow $b$, FIG. 2). The mandrel 4 also moves by the length of feed simultaneously with the shaper members and with the same speed. The glass strip 1 being in a plasticized state is bent and together with the shaper members 3 and the mandrel 4 is also advanced for a length of feed.

Then the shaper members 3 are brought apart to return into the initial position for the next length of feed to occur.

After returning to their initial position, the shaper members 3 are brought together again, and a next section of the tubular product is formed.

Figure 3:
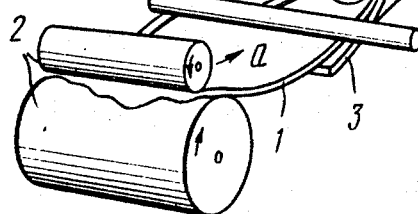
FIG. 3 shows the same process at the stage of jointing the strip edges to form a tube.

While so doing the strip 1 continues to advance (as indicated by the arrow $a$), its edges get jointed at the outlet of the shaper members 3 to form a tubular product 6 (FIG. 3). By repeatedly performing the above-described steps the tubular product 6 is continuously formed from the glass strip 1 that is then calibrated by the size rolls 5.

The herein-disclosed method is also applicable in forming shaped products of open contour such as a trough, angle, channel, and the like. In this case, the mandrel may be dispensed with.

Figure 4:
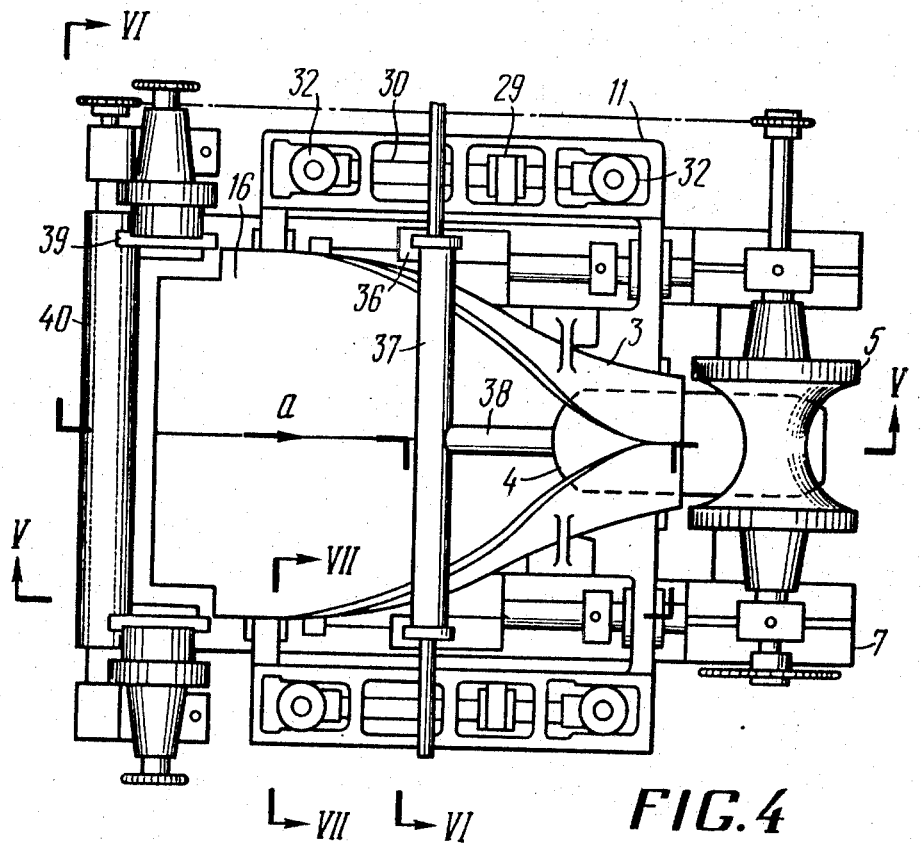
FIG. 4 is a plan view of a device for forming a tubular product.
Figure 5:
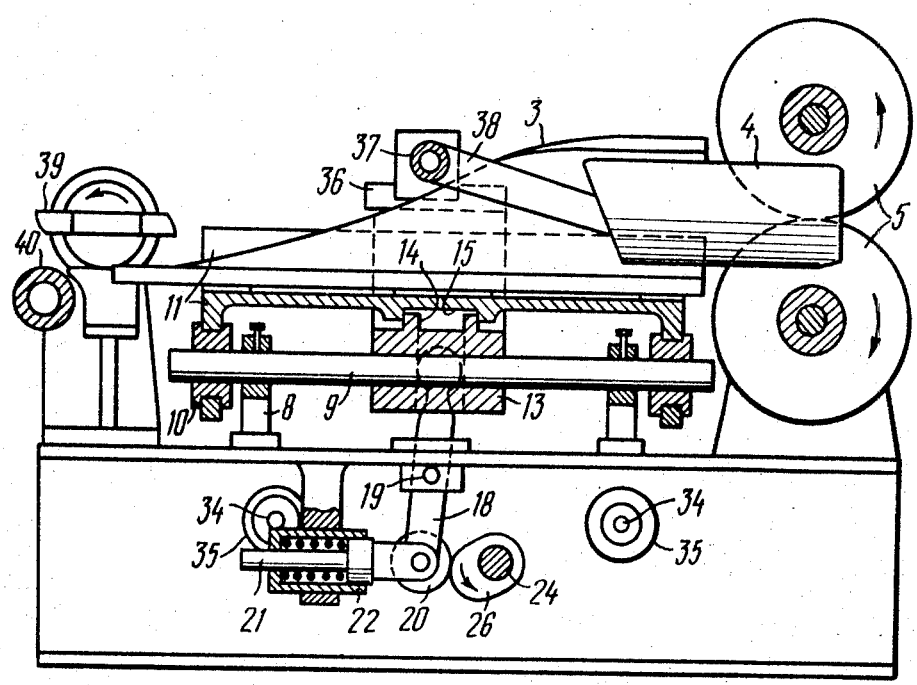
FIG. 5 is a section taken on the line V—V in FIG. 4.

The herein-proposed device for carrying the afore-described method into effect, viz, for forming a tubular structure, comprises a bed 7 (FIGS. 4–6) which carries stands 8 to mount four guide bars 9 (FIGS. 5 and 6) with slide blocks 10; two platforms 11 shaped as a channel whose flanges has holes 12 for the slide blocks 10 to be accommodated therein; two cross arms 13 each of which is mounted at the middle of the bar 9 and has projections 14 which are to engage slots 15 provided in the platforms 11; and two shaper members 3 made of a sheet 16 (FIG. 6) rolled up at one end along a sweep curve to a radius corresponding to that of the tubular product to be obtained, said members being fixed in position on the platforms 11. The construction of the cross arms 13 ensures mutual movable linkage between platforms 11 and cross arms 13.

Slots 17 are provided in the cross arms 13, into which slots the upper ends of arms 18 mounted on pivots 19 are free to fit; the bottom ends of said arms 18 that carry rotatable rollers 20, are linked pivotally to respective rods 21 of spring actuators 22.

A shaft 24 is mounted on the bed 7 to run in bearings 23, said shaft being drivingly connected with the drive (purposely not shown in the drawing) through a sprocket 25 of the chain drive.

A pair of axially spaced cams 26 are rigidly fixed to the shaft 24, the lobes of the cams being continuously engaged with the rollers 20.

A further pair of cams 27 are mounted at the ends of the shaft 24 the faces of whose lobes are likewise in constant engagement with respective rollers 28 mounted on arms 29 located at the middle of a pair of respective shafts 30. The ends of the shafts 30 mount arms 31 (FIG. 7) carrying at one end thereof rollers 32 which engage the slots formed by edges 33 of the platform 11 that serve as guideways.

The other ends of the arms 31 are pivotally interconnected to rods 34 of spring actuators 35.

A tubular bar 37 is mounted on the cross arms 13 by means of a pair of opposed brackets 36, said tubular bar carrying a mandrel holder 38 to which is rigidly coupled the water-cooled mandrel 4.

Located at the inlet of the shaper members 16 to the left and to the right sides thereof are a pair of respective mechanisms 39 for trimming the edges of the rolled thermoplastic strip which is backed up or supported from below by a drive roll 40.

The above-mentioned arms 18, 29, 31, cams 26, 27 and spring mechanisms 22 and 35 are parts of the lever-arm system acting from a drive.

The device described above operates as follows:

When the shaft 24 (FIGS. 5 and 6) carrying the cams 26 is rotated, the cams cause the rollers 20 of the arms 18 to pivot the latter through a small angle about the pivot 19 to provide a predetermined length of feed of the shaper members 3. This pivoting movement of the arms 18 imparts a longitudinal advancing movement to the shaper members in the direction of the arrow $a$ (FIG. 4) at a speed equal to the travelling speed of the strip. Concurrently, the cams 27 rotating together with the shaft 24, act upon the arms 29 fixed to the shaft 30 to impart torque thereto. The arms 31, with their top ends carrying the rollers 32, fixed at the ends of the shaft 30, press against the movable platforms 11 so that the latter while slipping along the slide blocks 10, travel inwardly towards the longitudinal axis of the device together with the shaper members 3, i.e., these approach each other. Further uniform rotation of the shaft 24 results in that the spring actuators 35, due to the tension of the springs acting upon the bottom ends of the arms 29 and 31, cause the movable platforms 11 complete with the shaper members to return to their initial position.

The contour of the cams 27 and 29 is made with due regard to an irregular operation thereof when being uniformly rotated, so that the shaper members 3 are returned to their initial position at a speed much greater than the travelling speed of the strip.

During the forming process the mandrel 4 together with the shaper members 3 performs reciprocating motion strictly lengthwise relative to the axis of the product being formed. The mobility of the mandrel 4 establishes favourable conditions for reducing friction forces arising between the mandrel working surface and the internal surface of the product being formed.

The rolls 5 calibrate the formed product and at the same time assist in the slipping of the formed section of the product off the mandrel. Thus, as it becomes evident from the above description, the method and the device proposed herein enable the forming of products practically of any shape, both closed as in tubes and open as in channels, troughs, and the like, from various thermoplastic materials.

The invention becomes especially valuable when applied for forming products from crystallizable glass, i.e., for producing glass-crystalline articles.

When applying the present invention a high production efficiency of forming shaped products is attained at high quality thereof.

What is claimed is:

1. A device for forming shaped products from thermoplastic materials in the form of a strip comprising a bed of said device, at least one bar fixed in position on said bed, a plurality of slide blocks movably mounted on said bar; a plurality of platforms adapted to interact with said slide blocks; shaper means mounted on the platforms, said shaper means being rolled in the form of a sweep curve to a radius corresponding to that of the product to be obtained; a plurality of roll members positioned adjacent the shaper means for calibrating and removing the shaped products from the device; and drive means for moving said platform with said shaper means along and transversely to the strip.

2. A device as claimed in claim 1, further including a mandrel rigidly coupled to the drive means.

3. A device as claimed in claim 2, wherein the drive means for each platform includes a cross arm having a socket for engagement by one end of the arm, the other end of the arm carrying a roller connected with the rod of a spring mechanism, and including a cam fixed on a shaft, the roller being in permanent contact with cam.

4. A device as claimed in claim 2, wherein the opposite end portions of the platforms have frame guideways for free slideable fitting of said slide blocks therein, the upper portions of said platforms having slots for mutual movable linkage with projections provided on cross arms of the drive means.

5. A method of forming shaped products from thermoplastic materials, comprising feeding a plastic strip at a constant speed along a path of travel, providing forming means in said path of travel having a first portion positioned toward the direction from which the strip is being fed which defines a planar surface onto which the strip is fed, and a further portion continuous with said first portion which includes a segment having the shape of the product being formed, passing the strip into the forming means while the working surfaces of the forming means are apart and moving the forming means towards the said strip by a distance which is shorter than the length of said segment; bending the strip by the working surfaces of the forming means by bringing the working surfaces towards each other and moving the forming means in the direction of the strip motion by said distance, thus imparting a desired shape thereto, and calibrating the formed shape by driven rolls imparting a precise geometrical shape to the product.

6. A method in accordance with claim 5, wherein the edges of the strip are supported interiorly during the formation of the product by a mandrel, exactly bringing the edges of the strip together such that they touch each while moving the mandrel longitudinally in synchronism with the forming means.

References Cited

UNITED STATES PATENTS

| | | | |
|---|---|---|---|
| 2,140,213 | 12/1938 | Tegarty | 65—106 X |
| 3,223,762 | 12/1965 | Fry | 264—339 X |
| 2,236,617 | 2/1966 | Jamnik et al. | 65—184 X |

ROBERT L. LINDSAY, JR., Primary Examiner

U.S. Cl. X.R.

65—106, 184; 264—295, 339; 425—436